Dec. 6, 1927.　　　　　　　　　　　　　　　　　　1,651,865
H. D. BLAKE ET AL
APPARATUS FOR MAKING INCANDESCENT LAMPS AND SIMILAR ARTICLES
Filed April 12, 1923　　　5 Sheets-Sheet 1
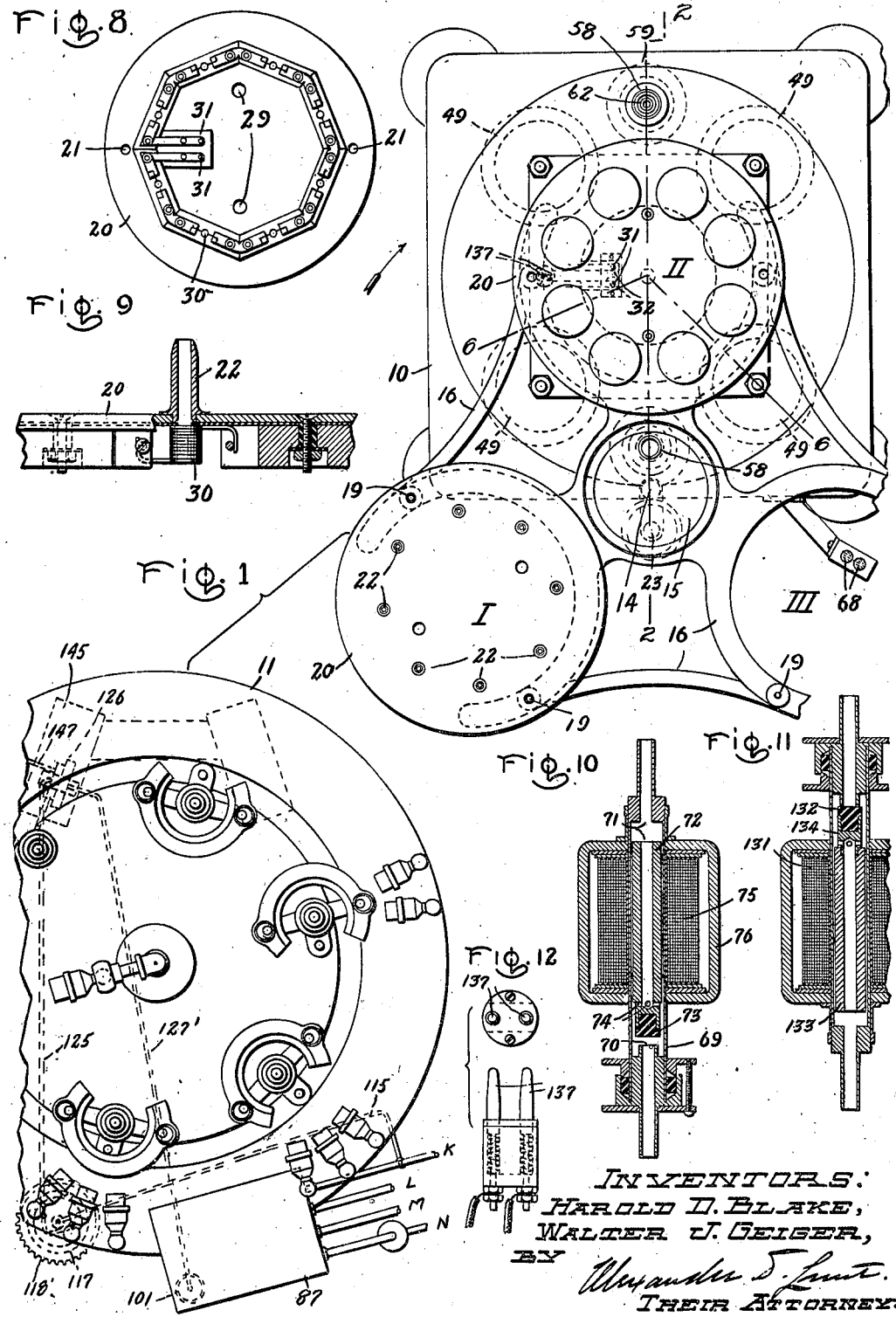
INVENTORS:
HAROLD D. BLAKE,
WALTER J. GEIGER,
BY Alexander S. Smith
THEIR ATTORNEY.

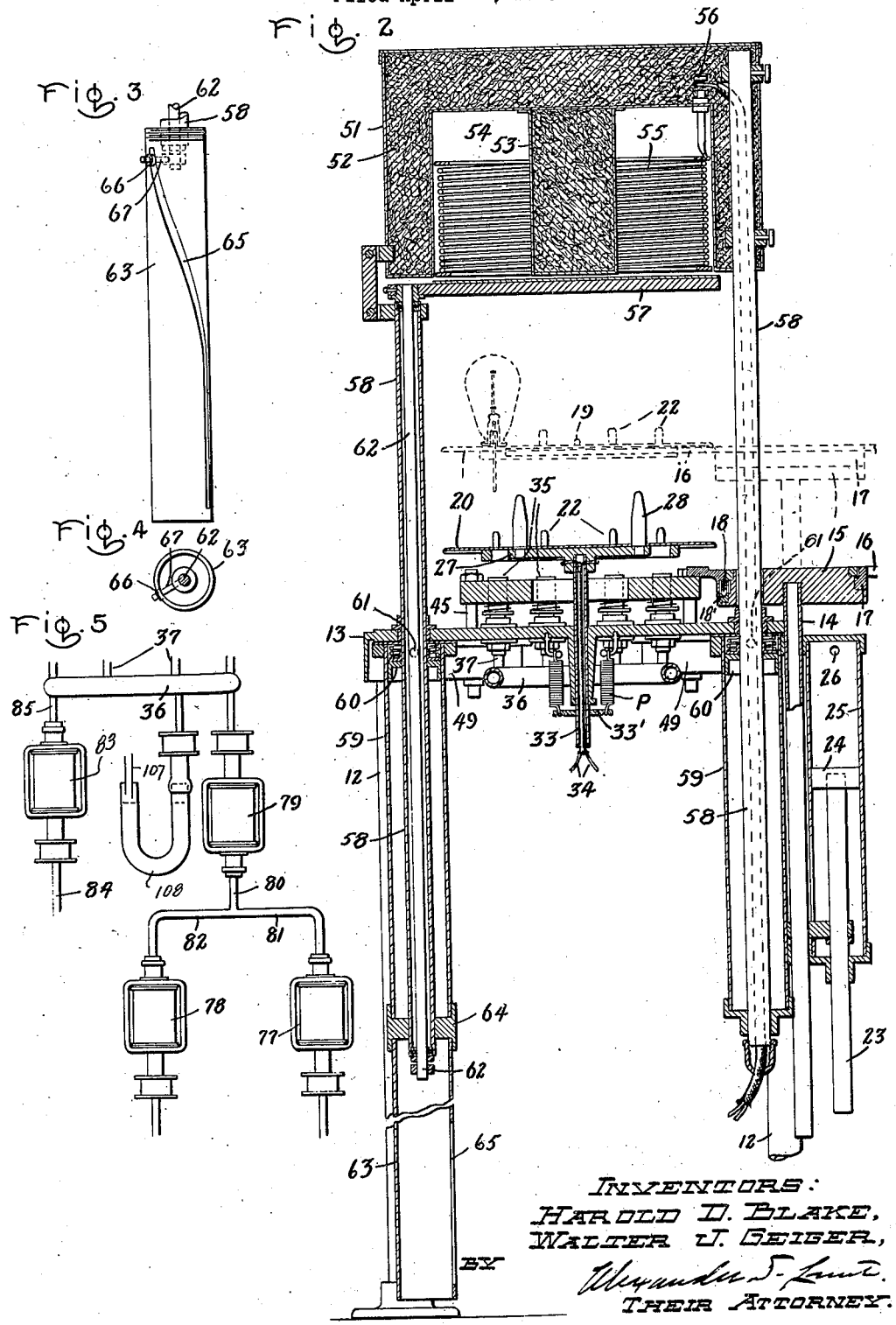

Dec. 6, 1927.  1,651,865
H. D. BLAKE ET AL
APPARATUS FOR MAKING INCANDESCENT LAMPS AND SIMILAR ARTICLES
Filed April 12, 1923    5 Sheets-Sheet 4
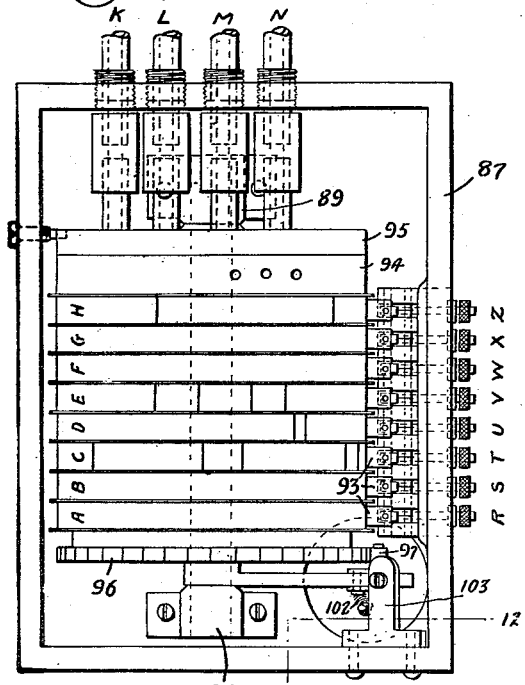
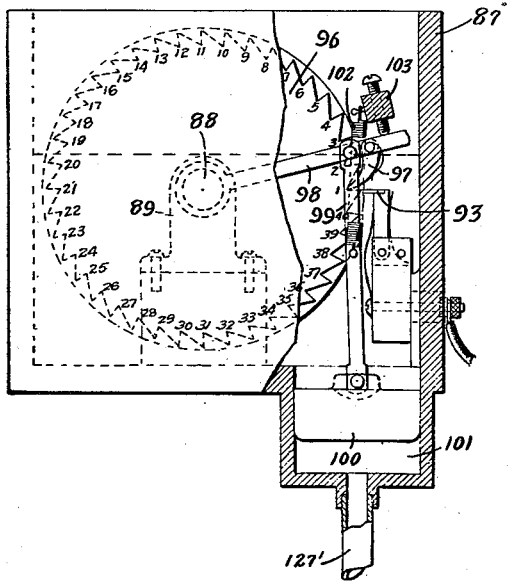
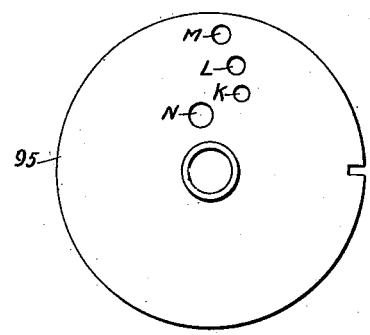
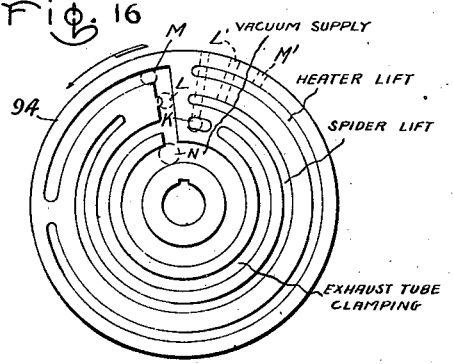
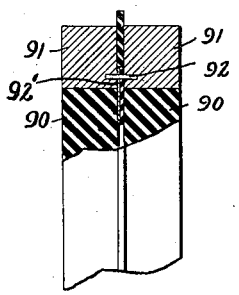
INVENTORS:
HAROLD D. BLAKE,
WALTER J. GEIGER,
BY
THEIR ATTORNEY.

Dec. 6, 1927.                                                                1,651,865
H. D. BLAKE ET AL
APPARATUS FOR MAKING INCANDESCENT LAMPS AND SIMILAR ARTICLES
Filed April 12, 1923                    5 Sheets-Sheet 5
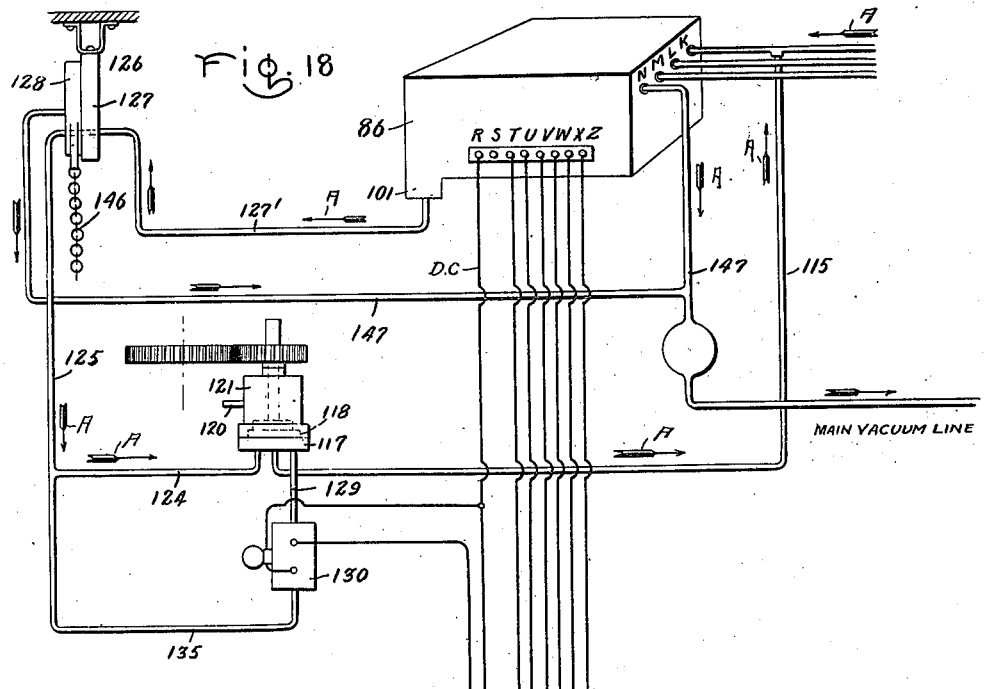
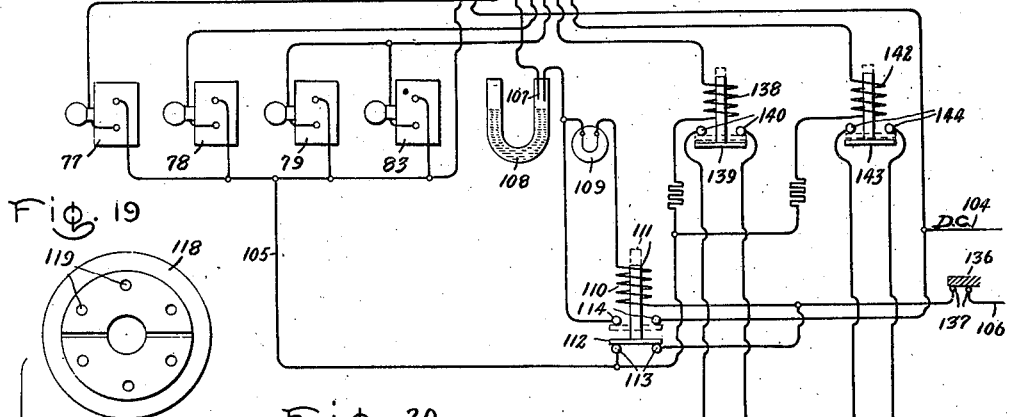
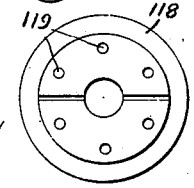
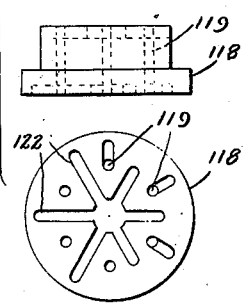
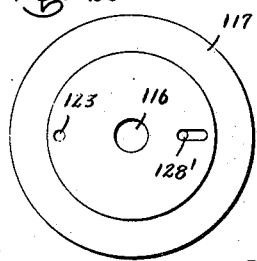
INVENTORS:
HAROLD D. BLAKE,
WALTER J. GEIGER,
BY
THEIR ATTORNEY.

Patented Dec. 6, 1927.

1,651,865

UNITED STATES PATENT OFFICE.

HAROLD D. BLAKE AND WALTER J. GEIGER, OF CLEVELAND, OHIO, ASSIGNORS TO GENERAL ELECTRIC COMPANY, A CORPORATION OF NEW YORK.

APPARATUS FOR MAKING INCANDESCENT LAMPS AND SIMILAR ARTICLES.

Application filed April 12, 1923. Serial No. 631,736.

Our invention relates to exhaust machines for electric incandescent lamps and other electrical devices comprising sealed glass containers. The machines which have been in use for some time are rotary machines in which the lamp is inserted at one point and travels step by step, the connections between the exhaust pumps and the lamps being made through rubber tubes and the ports of a sliding disc valve. This machine has the disadvantages that leakage occurs at the numerous rubber tube connections and at the disc valve. The lubrication of the disc valve is a source of trouble on account of oil vapors getting into the lamp. Moreover this machine requires a separate operator and therefore is difficult of coordination with other machines.

One of the objects of our invention is to eliminate the necessity for valves with sliding parts and rubber tube connections supplemented by oil and so to eliminate such leakage as has arisen therefrom and also the objectionable oil vapors. A further object is to provide improved automatic tipping facilities resulting in more uniform tipping. A still further object is to provide a machine operable with a minimum of manual control and which can be combined in operation with a sealing-in machine so that one operator can take care of both sealing-in and exhaust operations at one time. Various other advantages and features of our invention will appear from the detailed description of a species thereof which follows.

Figure 6:
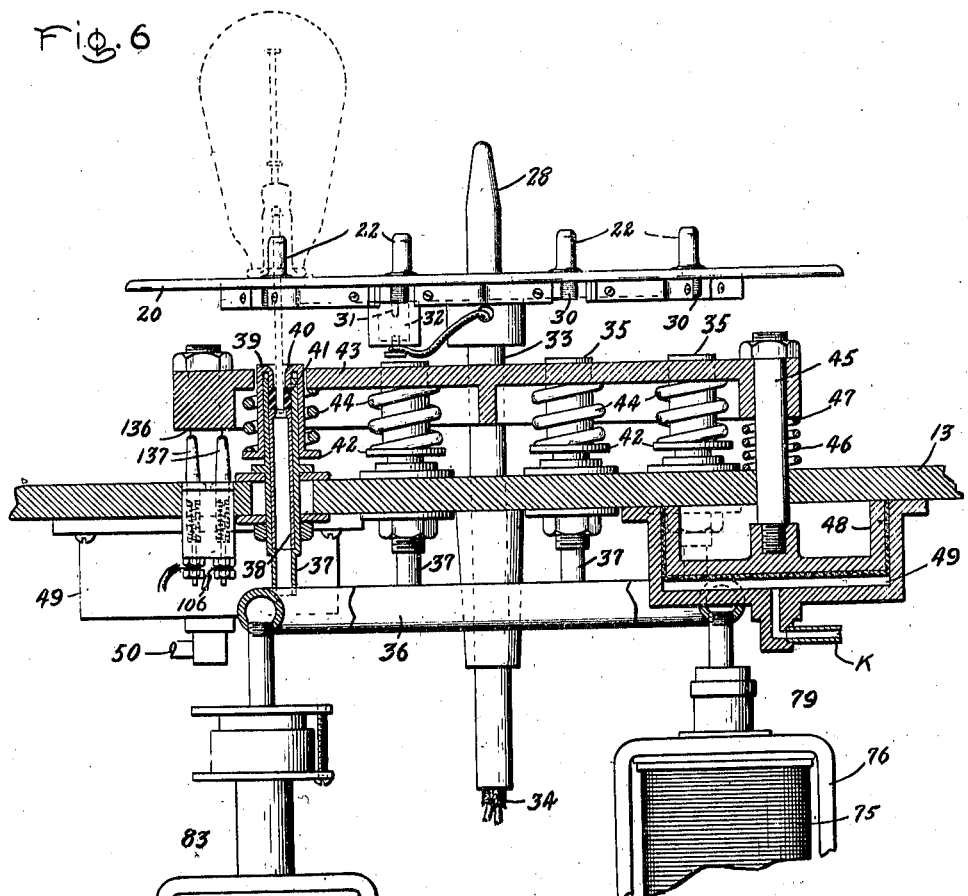
Figure 7:
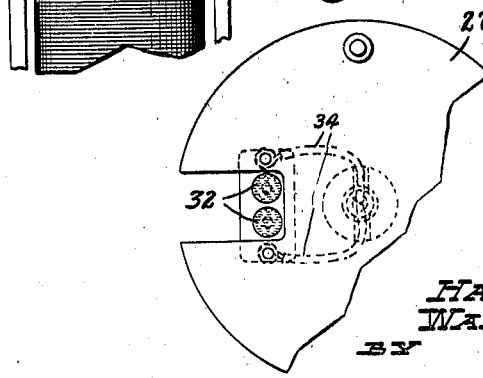

In the drawing Fig. 1 is a plan view showing the combination of our exhaust machine with a sealing-in machine; Fig. 2 is a vertical section of the exhaust machine on line 2—2 of Fig. 1; Fig. 3 is a detail elevation of the cam which operates the heater cover; Fig. 4 is a plan view of the said cam; Fig. 5 is a partial elevation of the electric valves which control the vacuum lines; Fig. 6 is an enlarged vertical section on the line 6—6 of Fig. 1; Fig. 7 is a partial plan view of the tipping tray; Fig. 8 is a bottom plan view of the tipping tray; Fig. 9 is an enlarged vertical section of a portion of said tray; Fig. 10 is a vertical section of an electric valve; Fig. 11 is a similar view of a modification thereof; Fig. 12 comprises an elevation and a top plan of a switch; Fig. 13 is a plan view of the commutator; Fig. 14 is a side elevation broken away to show a section along the line 12—12 of Fig. 13; Fig. 15 is a plan view of the stationary member of a distributing valve mounted with the commutator; Fig. 16 is a similar view of the movable member of the valve; Fig. 17 is a fragmentary view in section of two adjacent segments of the commutator; Fig. 18 is a diagrammatic view showing the vacuum lines and other elements with their electric circuits; Fig. 19 comprises top and bottom plan and side elevation views of the rotary member of another valve; and Fig. 20 is a plan of the stationary member thereof.

As shown in Fig. 1 of the drawing, the exhaust machine 10 is positioned adjacent to a sealing-in machine 11 so that one operator may take care of both machines simultaneously. The sealing-in machine is of the type disclosed in Swan Patent No. 1,011,523 of December 12, 1911, and Mitchell and White Patent No. 1,453,594 of May 1, 1923. The machines as illustrated are particularly adapted for producing the so-called tipless lamps of the character disclosed in Mitchell and White Patent No. 1,423,956 of July 25, 1922. These lamps comprise a central tubular stem, which serves to support the filament and also the leading-in conductors. The stem is made with an exhaust tube extending longitudinally within the same and somewhat beyond the outer edge or flange. At its inner end, this exhaust tube communicates with the interior of the bulb through an aperture in that portion of the stem in which the leading-in wires are sealed. The lamp is exhausted through this tube by connecting the latter to a source of vacuum. Preliminarily to this, however, the stem is sealed into the bulb and this is done in what is known as a sealing-in machine of which 11 is an illustration. The next step in the manufacture of the lamp is to evacuate the bulb and, if the lamp is to be of the gas-filled type, to replace the air which has been withdrawn by an inert gas. The machine for performing this operation is known as an exhaust machine. It is to this machine that our invention particularly relates, although a feature of our invention is its combination and cooperation with a sealing-in machine which calls for an interconnection between the machine and the addition of certain parts to the sealing-in machine.

Referring particularly to Fig. 2, it will be seen that our improved exhaust machine comprises suitable standards 12 upon which is supported, at a convenient height, a table 13. Upon a slidable support 14 which is carried by said table, is a plate 15 which has supported thereon a spider 16. The said spider is rotatable on said plate 15, having a central flange 17 resting on a flange of the plate 15, and carrying a spring-pressed pin 18 which is adapted to engage a series of three depressions 18' substantially 120 degrees apart, in the flange against which it rests so as to enable the operator to stop the spider in a desired position. The spider 16 has three forked brackets which carry pins 19. The tipping tray 20, which is shown in detail in Figs. 8 and 9, has a pair of apertures 21 through which the pins 19 enter to hold the tray in position. A number of hollow pegs, 22 specifically eight in number, extend upwardly from the tray 20 and the hollow stems of the lamps seat thereon with their exhaust tubes extending therethrough. It is to one of these trays that the operator feeds the lamps as they are completed in the sealing-in machine, and this feeding position of the tray is indicated as I.

After the tray has been filled with lamps from the sealing-in machine, it is turned to position II, occupying the elevated position shown in dotted lines in Fig. 2. The next step is to lower the tray which is accomplished by lowering the support 14. The latter is coupled to a piston rod 23 which is connected to a piston 24 working in a cylinder 25. This cylinder has a port 26, and to raise the piston 24, the port is connected to a source of vacuum (not shown), and to lower the piston the vacuum is relieved. The plate 15 and the spider carried thereby lower to the position shown in full lines in Fig. 2. The tray 20, however, encounters a plate 27 which, as shown in Figs. 2 and 7, has a pair of guide pins 28 which pass through apertures 29 in the tray. Mounted on the bottom of the tray 20 and registering with the passages in the hollow pegs 22 so as to be in good thermal relation with the exhaust tubes of the lamps, are electric heating coils 30 which are suitably insulated from the rest of the tray and are connected in series, one coil being provided for each lamp. The coils are preferably of the usual nickel-chromium heat resistance wire. We have secured especially goods results from a coil of nickel-chromium wire in which successive turns are in contact, reliance being had on the oxidation of the wire to provide sufficient insulation to prevent short-circuiting. A pair of downwardly projecting terminal pins 31 are electrically connected to the heating coils. The plate 27 carries a pair of mercury cup terminals 32, as shown in Fig. 7, which are engaged by the terminal pins 31 when the tray 20 is lowered as described. The plate 27 is supported by a central column 33 through which extend suitable electric connections 34 for the said mercury cup terminals.

When the tray 20 is lowered into contact with the plate 27, the lower ends of the exhaust tubes enter clamp tubes 35 which are mounted on the table 13 and are connected to the exhaust manifold 36. As shown in Fig. 6, these clamp tubes comprise a casing 37 connected to manifold 36 and clamped to table 13, an inner tube 38 and a sleeve 39. Said sleeve fits over the end of casing 37 and has a re-entrant flange 40 which bears against a rubber or other resilient packing or washer 41 which is seated on the top of inner tube 38 and of such bore as to normally allow the ready passage of an exhaust tube therethrough. Each of the sleeves 39 has a lower outwardly extending flange 42 between which and a clamp plate 43 is positioned a spring 44. The plate 43 is supported by four rods 45 which extend through the table 13, a spring 46 surrounding each of said rods being interposed between the table 13 and a boss 47 on the lower part of the plate 43. The lower end of each rod 45 is attached to a piston 48 which works in a cylinder 49 connected to a source of vacuum through pipe K. When the vacuum is connected to each of the cylinders 49, as hereinafter described, the consequent lowering of the plate 43 serves to compress the rubber washers in the clamp tubes against the exhaust tubes so that they are very firmly gripped and a very efficient connection to the manifold is secured.

It is customary to heat the lamp or other bulbs during evacuation and we have provided a means for accomplishing this which is shown particularly in Fig. 2. It comprises a hollow walled cover 51 which is provided with suitable heat insulation 52 and which has a central partition 53 forming an annular chamber 54 of such dimensions that it can pass over the annular row of incandescent lamps in the tray 20. An electrical heating element 55 extends around the chamber 54 and, as shown, is of the so-called "sheath" type and is provided with suitable terminal connections 56. Current may be allowed to pass continuously through the heating unit so as to maintain the chamber at a comparatively high temperature. A closure 57 serves to close the chamber and to conserve the heat therein when it is not in use. Means are provided for lowering the cover 51 so that the bottom thereof comes into contact with the tray 20 in its lowermost position. This is preferably accomplished immediately following the clamping of the exhaust tubes. For this purpose the cover 51 is mounted on a pair of hollow supports 58, the lower end of each of which extends into a cylinder 59 attached to the table 13. A piston 60 is attached to the said support and works in the said cylinder, the said cylinder being connected to a source of vacuum (not shown) to elevate the piston and the vacuum being relieved to lower the same, through the port 61. The weight of the cover 51 is sufficient to depress the tray, and support plate 27 against the action of spring P supported between the table 13 and a saddle 33' carried by the column 33. When the cover 51 is lowered it is necessary to swing the closure 57 out of registry therewith so that the bulbs may enter the heating chamber 54. For this purpose the closure 57 is mounted on a rod 62 which is rotatably supported within one of the hollow rods 58. A cylindrical extension 63 is carried by the bottom 64 of cylinder 59 and has therein a cam slot 65 as shown in Figs. 2, 3 and 4. A roller 66 attached to an arm 67 which is carried at the lower end of the rod 62 rides in the cam slot 65 and serves to turn the rod 62 and the closure 57 into and out of registry with the cover 51 so that when the latter is in its lower-most position, closure 57 is off to one side and does not interfere with the lamps in the tipping tray and when the heater 51 is in its elevated position, the closure 57 registers therewith and confines the heat therein.

After the lamps have been properly exhausted, the heater 51 elevated and the plates 20 and 27 have sprung back to the position shown in full lines in Fig. 2, an electrical connection is made so as to cause the heating coils 30 to operate to fuse the exhaust tubes without severing them and to thus seal the lamps. The vacuum is then relieved in the cylinders 49 to cause plate 43 to be lifted and the pressure to be removed from the rubber washers, thus permitting the withdrawal of the exhaust tubes. The vacuum is then connected to the cylinder 25 causing the piston 24 to be raised and with it the plate 15 and the spider 16. The latter engages the tray 20 and raises it with the lamps and their depending exhaust tubes to the position shown dotted in Fig. 2. This completes the cycle and the operator then turns the spider to bring the tray under consideration to position III and a new tray to position II. At position III are mounted a pair of mercury cup terminals 68 in such position that the terminal pins 31 of the tray 20 engage with them when the spider is lowered to bring the tray at position II in engagement with the plate 27. At position III, those portions of the exhaust tubes which extend beyond the seals made in position II, are again fused by heat from the coils 30, the weight of the lower ends of the exhaust tubes being sufficient to cause their severance from the lamps.

We have provided a system of electric valves for controlling the vacuum lines for exhausting the lamps. The electric valve as shown in Fig. 10, comprises a tube 69 of non-magnetic metal connecting ports 70 and 71. The valve proper consists of a hollow iron armature 72 with a tip 73 of rubber or other yielding material. Passages 74 in the armature complete the passage for vacuum between ports 70 and 71. A solenoid 75 having an iron yoke 76 surrounds and is supported by tube 69 so as to control the position of the armature and so to open or close the valve. As shown in Fig. 5, four of these valves are provided for the exhaust operation. One of these, 77, controls the preliminary or rough vacuum. Another, 78, controls the dry air line. Still another, 79, controls the conduit 80 to which the conduits 81 and 82 leading to the valves 77 and 78, respectively, connect. The fourth valve 83, controls the passage from conduit 84 leading from the final vacuum pump to conduit 85 connected to the manifold 36. In operation, the dry air and rough pump lines are alternately connected to the manifold by alternately opening valves 77 and 78, valve 79 being open and valve 83 closed. This is repeated a number of times as better results are secured in this way than by straight evacuation. When the final vacuum pump is connected to the manifold, by opening valve 83, valves 78 and 79 are closed so as to prevent any leakage, valve 77 being open so that the rough vacuum will assist in maintaining a tight closure of valve 79.

In Fig. 18 is shown diagrammatically the vacuum and electric control system. The main control is through commutator 86. This is shown in detail in Figs. 13 and 17 inclusive, and comprises a box 87 within which is mounted the commutator proper which is a cylinder composed of sections mounted on a shaft 88 rotatably supported in bearings 89. A quantity of oil extending above the bearings is maintained in the box to prevent arcing and to provide good lubrication. There are eight segments which control the electrical circuits of the apparatus and these are lettered A, B, C, D, E, F, G and H. In Fig. 17 two adjacent segments are shown as made up mainly of insulating blocks 90 carrying at their periphery metallic blocks 91 which are connected by conductor pins 92' and conductor strips 92 so that a conductive path always exists from the conductive block on segment A to all other such blocks on the other segments. These blocks extend around the periphery and are of the proper length so as to maintain a given circuit for the proper interval when contacted with by stationary brushes 93 mounted within the box 87 and connected to terminals on the outside of the box. These terminals are lettered R, S, T, U, V, W, X and Z. R is the common terminal connected to one side of a direct current line D. C. S, as shown, is a spare terminal. T corresponds to the rough pump, U to the leak detector, V to the dry air line, W to the final pump, X to the preliminary tipping means and Z to the final tipping means. On the same shaft with the commutator proper is the rotating member 94 of the main distributing valve, the stationary member of which is 95. The latter has ports therein, one of which is connected to pipe K leading to the clamping cylinders 49 (Fig. 6) one to pipe L leading to port 26 of the spider lifting cylinder 25 (Fig. 2), one to pipe M connected to port 61 of the heater lifting cylinders 59 (Fig. 2), and one to pipe N connected to the rough or preliminary vacuum line. The commutator cylinder is rotated by a pawl and ratchet device of which the ratchet 96 is mounted on the shaft 88 and the pawl 97 is mounted on an arm 98 loosely mounted on the said shaft and raised and lowered by an arm 99 pivotally connected thereto at one end and at the other end to a piston 100 working in cylinder 101. A spring 102 is attached at one end to the arm 99 and at the other to an adjustable block 103 carried by box 87.

It will be apparent that when the vacuum is connected to the cylinder 101, the piston 100 is drawn down thus actuating the pawl and ratchet mechanism to turn the commutator one notch in a clock-wise direction. Thereafter when the vacuum is relieved, the spring 102 draws back the pawl 97 and the parts are in position so that when the vacuum is connected again, the commutator is turned another notch.

As shown in Fig. 18, one side 104 of a direct current line is connected to the terminal R of the commutator. When the commutator has been rotated so that segment C is in electrical contact with the terminal T the circuit is connected through the solenoid of valve 77 of the rough pump and through the conductor 105 to the other side 106 of the direct current line. The next contact which is made is with a leak detector circuit which occurs when segment D is in electrical contact with terminal U. At this time the circuit of the preliminary vacuum valve 77 is broken. Ordinarily, when there is no "leaker", as a lamp is called which is not airtight, nothing happens because this circuit comprises a pair of terminals 107 which are mounted in a mercury U tube 108 connected to the manifold, and, when vacuum is not destroyed by the presence of the "leaker", the mercury is kept out of contact with the terminals. However, should a leaker be present, the mercury rises on the side of the U tube in which the said terminals are located, thus completing the circuit. This circuit comprises a warning lamp 109 which may be red and a solenoid 110 which actuates an armature 111 carrying a connector 112 which normally rests upon the terminals 113 thus completing the return circuit through the valve 77 and other valves as hereinafter will more fully appear. However, when the leaker circuit is completed as described, the armature 111 is drawn up in the solenoid 110 and the connector 112 is separated from the terminals 113, thus breaking the circuit through all of the electric valves and both magnets controlling the tipping circuits so as to prevent their operation. At the same time connector 112 is brought into contact with terminals 114 and this causes the circuit to be completed through the solenoid 110 from the conductor main 104 back to the other side of the line to hold the connector 112 in contact with the terminals 114 independently of the mercury contact circuit. Simultaneously there is brought into play a means for speeding up the action of the commutator so that the operator may remove the faulty lamp or tray of lamps as soon as possible.

The actuating means for the commutator drive during the cycle is vacuum which is derived from the line of pipe K leading to the clamping cylinders 49 through pipe 115 connected to port 116 of a stationary disc 117 shown in Fig. 20. A disc 118, which is rotatably driven through suitable gearing 118' by the sealing-in machine drive and which is shown in detail in Fig. 19, bears against one face of the stationary disc 117 and comprises a series of passages 119 which are connected to the atmosphere through vent 120 in casing 121. That side of the valve disc 118 which contacts with the valve disc 117 has a series of radial grooves 122, three of which are long and three are short. As the disc 118 rotates, the three longer passages 122 successively serve to connect the central port 116 with a peripheral port 123 and thus cause the vacuum to be directed through pipe 124 and pipe 125 leading to a valve 126. The latter comprises a stationary disc 127 and a rotary disc 128 actuated as hereinafter described and is shown in its normal position with the pipe 125 connected to pipe 127' leading to the commutator drive. The three passages 119 which have radial extension slots connected thereto are also connected in succession during each rotation to the said port 123 thus relieving the vacuum. This is the normal operation. However, as stated before, when a leaker is encountered, it is desirable to speed up the machine. A port 128' is provided in the stationary disc 117 and this is connected to a pipe 129 leading to the electric valve 130. The said valve is shown in Fig. 11, and is similar to the valve shown in Fig. 10 except that it is so disposed that when its solenoid 131 is energized, the valve proper with its resilient tip 132 is held against its seat and when de-energized, the valve drops and opens. It is a feature of this valve that the iron core or armature 133 is so disposed that a strong pull is exercised by the solenoid to keep the valve firmly seated. The upper portion 134 of the armature is preferably of brass as this serves to increase the valve seating pressure which is exercised by the solenoid.

Again referring to Fig. 18, it will be seen that the electric circuit through the solenoid 131 is completed at the same time that the circuit is completed through the valves 77, 78, 79 and 83, and thus the valve 130 is kept closed during the normal operation. However, when a leaker is encountered, the breaking of the circuit through the valve 77 and the others also breaks the circuit through the valve 130 and allows it to open. Referring to Figs. 19 and 20, it will be apparent that the extent and disposition of slots 122 and passages 119 are such that the port 128' engages them twice as many times during one revolution of the rotary disc 118 as does the port 123. Moreover, the port 128' alternately connects to a slot 122 and passage 119 while port 123 connects three times in succession to a slot 122 and three times in succession to a passage 119. Therefore, when the valve 130 is opened, the vacuum and relief port connected through the line 135 and valve 126 to the commutator drive will cause the commutator to be actuated six times as fast as normally. When a cycle has been completed and the plate 43 is raised to unclamp the lamp exhaust tubes, a connector 136 separates from the terminals 137 thus breaking the return circuit, de-energizing the solenoid 110 and allowing the connector 112 to drop into contact with the terminals 113. As shown in Figs. 6 and 12, the terminals 137 are mounted on table 13 and the connector 136 is carried by the clamping plate 43.

When the segment E is in electrical contact with terminal V, the valve 78 which is of the type shown in Fig. 10 is opened to cause dry air to pass into the lamps. The segments C and E, are designed so that there are the desired number of alternate connections to the rough pump and dry air lines to obtain the best results.

When the segment F is in electric contact with terminal W, valve 79, which is of the inverted type shown in Fig. 11, is closed to ensure the closing off of the dry air and rough vacuum lines, and valve 83 which is of the type shown in Fig. 10, is opened to connect in the final vacuum line.

When the segment G is in electrical contact with terminal X, the solenoid 138 is energized to raise a connector 139 into contact with terminals 140 thus completing a circuit from an alternating current source 141 through mercury contacts 32 and the tray heating coils 30. When segment H is in electrical contact with terminal Z, solenoid 142 is actuated to raise connector 143 into contact with terminals 144 and a circuit is completed through mercury contacts 68 and the coils 30 of a tray in position III.

After the lamps have been properly sealed in on the sealing-in machine, they are removed by the operator and placed in the tipping tray 20 which is now located at position I (Fig. 1). The tipping tray is carried by the rotatable spider 16, said spider being held in the elevated position (as shown in dotted lines Fig. 2) by means of vacuum from the main vacuum line acting through pipe N (Fig. 18), through the main distributing valve 94—95 (Fig. 16), and finally through port 26 of the spider lifting cylinder 25 (Fig. 2). As soon as the tray 20 has been filled the operator rotates the spider 16 to position II thus bringing the tray lamps with their exhaust tubes extending therethrough directly over a number of clamp tubes 35 which are mounted on the table 13 and are connected to the exhaust manifold 36. In order to start the exhaust machine cycle, the operator presses the pedal 145 (Fig. 1) which through a chain 146, serves to rotate the valve disc 128 to connect the main vacuum line 147 to the commutator drive cylinder 101 through the pipe 127' (Fig. 18). It will be apparent that when vacuum is connected to the cylinder 101, the piston 100 is drawn down thus actuating the pawl and ratchet mechanism to turn the commutator one notch, which in turn moves the valve disc 94 a short distance in the direction of the arrow Fig. 16. The pipe L which was heretofore on vacuum, is now connected to the air through the passage L', in the valve 94 thereby relieving the vacuum in the cylinder 25, allowing the spider 16 to descend to deposit its tray of lamps on the plate 27 at which time the lower ends of the exhaust tubes enter the apertures of the clamp tubes 35. The pedal is released and then pressed again which rotates the commutator another notch thereby bringing the pipe M in communication with the air through the passage M' relieving the vacuum in the cylinders 59 which allows the cover 51 to descend until it completely covers the tray of lamps for the purpose of heating the same during the evacuation process. At the same time that pipe M is connected to the air, the pipe K is connected to vacuum. Vacuum is now connected to the cylinders 49 through pipe K thereby pulling down the pistons 48 (Fig. 6) and lowering the plate 43 which serves to compress the rubber washers 41 in the clamp tubes 35 against the exhaust tubes so that they are firmly gripped and a very efficient connection to the manifold is secured. The commutator having been turned two notches, the path of the vacuum is now from the main vacuum line into the valve 94 and out through the pipe K to the clamping cylinders 49, the vacuum also being connected through pipe 115 to the distributing valve disc 118 which alternately delivers vacuum and air to the commutator drive cylinder 101 through the pipes 124, 125, valve 126 and pipe 127'. The exhaust cycle now being started, the path of the vacuum is indicated by arrows A as shown in Fig. 18. After the lamps have been properly exhausted the heater 51 is elevated after which an electrical connection is made so as to cause the heating coils 30 to operate to fuse the exhaust tubes without severing them and to thus seal the lamps. The rotation of the commutator continues until the pipe K is in communication with the air through passage K' which relieves the vacuum in the cylinders 49 causing the plate 43 to be lifted thereby removing the pressure from the rubber washers and permitting the withdrawal of the exhaust tubes. The vacuum now being cut off from the pipe K, is also cut off from the cylinder 101 thereby stopping the rotation of the commutator. At this time pipe L is in communication with the vacuum and the piston 24 is raised and with it the plate 15 and spider 16. The latter engages the tray 20 and raises it with the lamps and their depending exhaust tubes to the position shown in dotted lines in Fig. 2. This completes the cycle, the commutator having been moved two notches by vacuum from the main vacuum line through pipes 147 and the thirty-eight notches by vacuum from the pipe K through pipe 115. The various vacuum and air connections are now as shown in Fig. 16, namely, pipe L, which leads to the spider lifting cylinder 25, is on vacuum; pipe M, which leads to the cover lifting cylinders 59, is on vacuum; and pipe K, which leads to the exhaust tube clamping cylinders 49, and to commutator cylinder 101 through pipe 115, is on air. The operator next turns the spider to bring the tray under consideration to position III (Fig. 1) and a new tray to position II, and then presses the pedal 145 as before to start another cycle. At position III those portions of the exhaust tubes which extend beyond the seals made at position II are again fused by heat from the coils 30, the weight of the lower ends of the exhaust tubes being then sufficient to cause their severance from the lamps. After the machine has completed its cycle, the spider is again rotated, bringing the tray of completed lamps to position I where they are removed by the operator.

We have obtained good results from the following schedule in which the intervals represent notches on the commutator ratchet 96, the commutator having been turned two notches.

Notches 3–4, preliminary vacuum on.
Notches 5–6, no connection to lamps which gives a leaker time to show up.
Notch 7, leak detector.
Notches 8–9, dry air supply on.
Notches 10–11, preliminary vacuum on.
Notches 12–13, dry air supply on.
Notches 14–15–16, no connection to lamps to allow additional time for heating.
Notches 17–18, preliminary vacuum on.
Notches 19 to 38 inclusive, final vacuum on with preliminary vacuum also on to maintain tight closure of valve 79.
Notches 32 to 40, vacuum to heater lift cylinder.
Notches 32 to 37, preliminary tipping circuit on to heat coils in position II.
Notches 2 to 13, final tipping circuit on to heat coils in position III.
Notches 38–39, interval to allow fused exhaust tube to set.
Notch 40, air to clamping cylinders and vacuum to spider lift cylinder.

The valve 130 is held closed throughout during normal operation but opens if there is a leaker and remains open during the rest of cycle.

What we claim as new and desire to secure by Letters Patent of the United States, is:—

1. In apparatus for making electric incandescent lamps and similar devices comprising sealed containers, the combination of a holder for receiving a number of blanks each comprising a bulb having an exhaust tube extending therefrom, an exhaust apparatus comprising a plurality of passages each adapted to receive the end of one of said exhaust tubes, means for causing said exhaust tubes to register with said passages, and means for substantially simultaneously clamping the ends of said exhaust tubes in said passages.

2. In apparatus for making electric incandescent lamps and similar devices comprising sealed containers, the combination of a holder for receiving a number of blanks each comprising a bulb having an exhaust tube extending therefrom, an exhaust apparatus comprising a plurality of passages each adapted to receive the end of one of said exhaust tubes, means for causing said exhaust tubes to register with said passages, and means for substantially simultaneously clamping the ends of said exhaust tubes in said passages, each of said clamping means comprising a resilient washer and means for compressing and releasing the same.

3. In apparatus for making electric incandescent lamps and similar devices comprising sealed containers, the combination of a holder adapted to receive a number of blanks each comprising a bulb having an exhaust tube extending therefrom, an exhaust apparatus comprising a plurality of passages, means for causing said exhaust tubes to register with said passages, means for clamping the ends thereof in said passages, and means for substantially simultaneously sealing off each of said exhaust tubes after the exhaust operation has been completed.

4. In apparatus for making electric incandescent lamps and similar devices comprising sealed containers, the combination of a holder for receiving a number of blanks each comprising a bulb having an exhaust tube extending therefrom, an exhaust apparatus comprising a plurality of passages each adapted to receive the end of one of said exhaust tubes, means for causing said exhaust tubes to register with said passages, means for substantially simultaneously clamping the ends of said exhaust tubes in said passages, and means for automatically performing the exhaust operation and for thereafter sealing off each of said exhaust tubes and finally disconnecting said exhaust tubes from said passages.

5. In apparatus for making electric incandescent lamps and similar devices comprising sealed containers, the combination of a plurality of holders each adapted to receive blanks each comprising a bulb having an exhaust tube extending therefrom, an exhaust apparatus comprising a series of passages, means for positioning one of said holders so that its exhaust tubes register with the said passages, means for clamping said exhaust tubes in said passages, means for performing the exhaust operation and for thereafter sealing off said exhaust tubes, means for thereafter disconnecting said exhaust tubes from said passages, and means for finally severing the ends of said exhaust tubes beyond the seals thereof.

6. In apparatus for making electric incandescent lamps and similar devices comprising sealed containers, the combination of a plurality of holders each adapted to receive blanks each comprising a bulb having an exhaust tube extending therefrom, an exhaust apparatus comprising a series of passages, means for positioning one of said holders so that its exhaust tubes register with said passages, means for clamping said exhaust tubes in said passages, means for performing the exhaust operation and for thereafter sealing off said exhaust tubes, means for thereafter disconnecting said exhaust tubes from said passages, and means for finally severing the ends of said exhaust tubes beyond the seals thereof, said severing means being positioned so as to operate upon the exhaust tubes of one holder while the preliminary operations are being performed upon the exhaust tubes of the other holder.

7. The combination of an open-ended casing having therein a shoulder near said open end, a resilient washer engaging said shoulder, a bearing member comprising a portion surrounding the end portion of said casing and a portion extending into said open end and engaging said washer, and means for forcing down said bearing member to expand said washer when desired.

8. In an exhaust machine, the combination of a series of tubes, each having supported therein a resilient washer and having mounted thereon a bearing member engaging said washer of a clamping plate mounted to engage each of said bearing members, and means for actuating said clamping plate in one direction to engage said bearing members or in the opposite direction to relieve the pressure upon said washers as desired.

9. In an exhaust apparatus, the combination of a conduit for uniting a manifold with a source of vacuum or gas, a valve seat in said conduit, a valve mounted to engage said seat and having connected thereto an armature, a solenoid surrounding said armature and adapted to move same and said valve with reference to said seat.

10. In an exhaust apparatus, the combination of a conduit connecting a manifold with a source of vacuum or gas, a valve seat in said conduit, a valve mounted to engage said seat and having an armature connected thereto, a solenoid surrounding said armature, said parts being so disposed that said armature is moved in one direction when said solenoid is energized and in the opposite direction by gravity when said solenoid is de-energized.

11. In an exhaust apparatus, a movable spider, removable trays supported on said spider and adapted to receive devices to be exhausted, an exhaust manifold, and means for assisting in the accurate positioning of said devices with reference to said manifold as the spider is moved to bring the said trays successively to said exhaust manifold.

12. In an exhaust apparatus, a rotatable spider, removable trays supported on said spider and adapted to receive devices to be exhausted, an exhaust manifold and means for assisting in the accurate positioning of said devices with reference to said manifold as the spider is rotated to bring the said trays successively to said exhaust manifold.

13. In an exhaust apparatus, the combination of a movable spider, a series of trays removably supported by said spider, an exhaust manifold positioned at one point in the travel of said spider, an exhaust tube severing means located at another such point, and means for assisting in the accurate positioning of the trays when the spider is moved to bring them successively into registration with said exhaust manifold and afterwards with said severing means.

14. In an exhaust apparatus, the combination of a rotatable spider, a series of trays removably supported by said spider, an exhaust manifold positioned at one point in the travel of said spider, an exhaust tube severing means located at another such point, and means for assisting in the accurate positioning of the trays when the spider is rotated to bring them successively into registration with said exhaust manifold and afterwards with said severing means.

15. In an exhaust machine, the combination of means for supporting a bulb having an exhaust tube extending therefrom, a clamp tube having an open end substantially aligned with said exhaust tube, a resilient washer supported within said tube, a member bearing on said washer, a clamping member mounted to engage said bearing member, means for moving said holder to cause said exhaust tube to enter said clamp tube, means for thereafter actuating said clamping member to cause the bearing member to press against and expand the washer, and means for causing the aforesaid means to operate in properly timed relation.

In witness whereof we have hereunto set our hands this 10th day of April, 1923.

HAROLD D. BLAKE.
WALTER J. GEIGER.